United States Patent
Muthuswamy

(10) Patent No.: US 9,311,338 B2
(45) Date of Patent: Apr. 12, 2016

(54) METHOD AND APPARATUS FOR ANALYZING AND ASSOCIATING BEHAVIORS TO IMAGE CONTENT

(71) Applicant: Adobe Systems Incorporated, San Jose, CA (US)

(72) Inventor: Pillai Subbiah Muthuswamy, Mumbai, IN (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 0 days.

(21) Appl. No.: 13/975,688

(22) Filed: Aug. 26, 2013

(65) Prior Publication Data
US 2015/0055871 A1    Feb. 26, 2015

(51) Int. Cl.
*G06K 9/46* (2006.01)
*G06F 17/30* (2006.01)
*G06K 9/00* (2006.01)
*G06F 3/0484* (2013.01)

(52) U.S. Cl.
CPC ...... *G06F 17/30253* (2013.01); *G06F 3/04842* (2013.01); *G06K 9/00456* (2013.01); *G06K 9/46* (2013.01)

(58) Field of Classification Search
CPC .......... G06T 7/2013; G06T 9/001; G06T 2207/20144; G06T 3/0056; H04N 19/00; H04N 19/17; H04N 19/51; H04N 19/54; H04N 19/543; H04N 7/181; H04N 5/66; G06K 9/00288; G06K 9/4604; G06K 9/00456; G06F 3/0346; G06F 17/212; G06F 17/2217; G06F 17/30011; G09G 2320/103; G09G 2320/106; G01S 7/4802
USPC ......... 382/195, 181, 180, 176, 197, 203, 218, 382/229, 253; 348/699, 443, 333
See application file for complete search history.

(56) References Cited

U.S. PATENT DOCUMENTS

| | | | | |
|---|---|---|---|---|
| 5,131,053 | A * | 7/1992 | Bernzott | G06K 9/00463 382/176 |
| 5,239,596 | A * | 8/1993 | Mahoney | 382/180 |
| 5,436,983 | A * | 7/1995 | Bernzott | G06K 9/00463 382/197 |
| 6,038,342 | A * | 3/2000 | Bernzott | G06K 9/00463 382/173 |
| 6,097,901 | A * | 8/2000 | Parulski | G03B 17/20 348/333.06 |
| 6,144,366 | A * | 11/2000 | Numazaki et al. | 345/156 |
| 6,636,630 | B1 * | 10/2003 | Adachi | H04N 1/40062 358/2.1 |
| 6,661,470 | B1 * | 12/2003 | Kawakami | G09G 3/2022 345/474 |
| 6,670,963 | B2 * | 12/2003 | Osberger | G06K 9/00711 345/582 |
| 6,694,053 | B1 * | 2/2004 | Burns | G06K 9/00469 382/176 |
| 6,766,056 | B1 * | 7/2004 | Huang | G06K 9/4604 358/453 |
| 6,859,204 | B2 * | 2/2005 | Curry | G06K 9/00456 345/426 |
| 7,287,220 | B2 * | 10/2007 | Kaasila et al. | 715/201 |
| 7,352,490 | B1 * | 4/2008 | Tse | H04N 1/3871 358/1.9 |
| 7,730,406 | B2 * | 6/2010 | Chen | H04N 5/272 382/254 |
| 7,929,613 | B2 * | 4/2011 | Kamijo et al. | 375/240.24 |

(Continued)

*Primary Examiner* — Vu Le
*Assistant Examiner* — Aklilu Woldemariam
(74) *Attorney, Agent, or Firm* — Keller Jolley Preece

(57) ABSTRACT

A computer implemented method and apparatus for analyzing image content and associating behaviors to the analyzed image content. The method comprises accessing a digital image; determining one or more patterns in the digital image; associating, based on the one or more determined patterns, a set of pre-defined behaviors with each determined pattern; and storing interactions with the digital image, wherein the interactions are associated with the behaviors.

20 Claims, 8 Drawing Sheets

(56) References Cited

U.S. PATENT DOCUMENTS

| | | | | |
|---|---|---|---|---|
| 8,364,540 B2* | 1/2013 | Soroca | G06F 17/30035 | 705/14.64 |
| 8,406,531 B2* | 3/2013 | Ramanujapuram | G06F 17/30244 | 382/201 |
| 2003/0139840 A1* | 7/2003 | Magee | D06B 11/0059 | 700/133 |
| 2004/0183817 A1* | 9/2004 | Kaasila | | 345/660 |
| 2004/0207625 A1* | 10/2004 | Griffin et al. | | 345/440 |
| 2005/0151743 A1* | 7/2005 | Sitrick | G09G 5/377 | 345/473 |
| 2006/0050320 A1* | 3/2006 | Ozaki | B41F 31/045 | 358/3.29 |
| 2007/0216687 A1* | 9/2007 | Kaasila et al. | | 345/441 |
| 2007/0237421 A1* | 10/2007 | Luo | G06T 11/60 | 382/284 |
| 2008/0028292 A1* | 1/2008 | Graham | G06F 17/30905 | 715/230 |
| 2008/0049238 A1* | 2/2008 | Nagarajan | G06K 9/38 | 358/1.9 |
| 2008/0088857 A1* | 4/2008 | Zimmer | H04N 1/56 | 358/1.6 |
| 2008/0298635 A1* | 12/2008 | West | G06K 9/3233 | 382/101 |
| 2009/0027305 A1* | 1/2009 | Cobene | H04N 9/3194 | 345/2.1 |
| 2009/0231628 A1* | 9/2009 | Matsuhira | G06K 9/00228 | 358/1.18 |
| 2012/0113141 A1* | 5/2012 | Zimmerman | G06Q 30/0643 | 345/633 |
| 2013/0215148 A1* | 8/2013 | Antonyuk | G06T 19/006 | 345/633 |
| 2013/0259139 A1* | 10/2013 | Valdez | H04N 21/44008 | 375/240.25 |
| 2014/0281946 A1* | 9/2014 | Avni | G06T 1/0021 | 715/268 |
| 2014/0363143 A1* | 12/2014 | Dharssi | G06K 9/00765 | 386/282 |

* cited by examiner

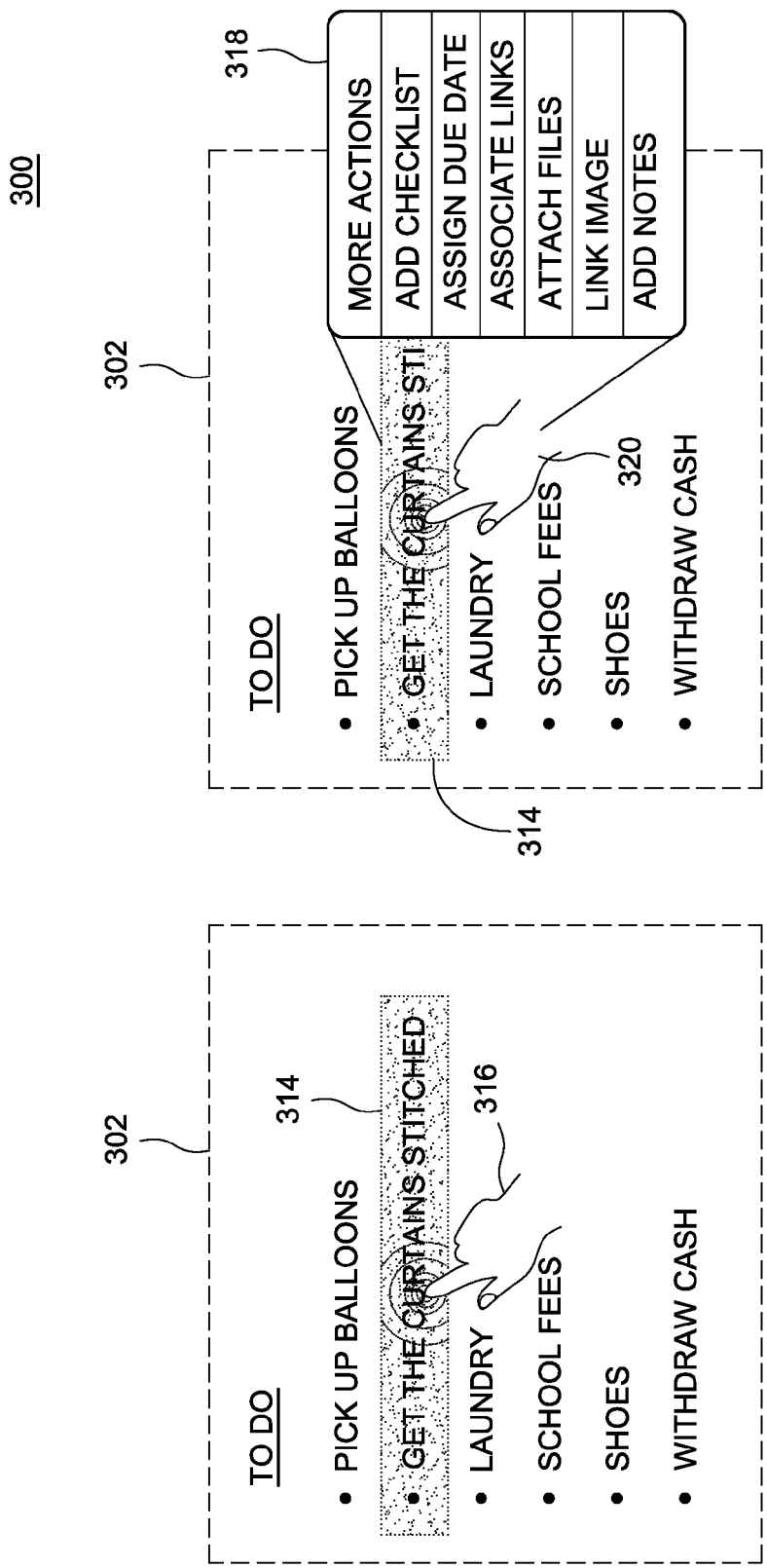

METHOD AND APPARATUS FOR ANALYZING AND ASSOCIATING BEHAVIORS TO IMAGE CONTENT

BACKGROUND

1. Field of the Invention

Embodiments of the present invention generally relate to image analysis and, more particularly, to a method and apparatus for analyzing image content and associating behaviors to the analyzed image content.

2. Description of the Related Art

Many people take notes in different forms in order to keep a record of their ideas, to-do lists, minutes of a meeting, and the like, in a single location for easy reference. With the widespread availability of cameras and scanners, it is very easy for people to simply take a snapshot of a whiteboard screen or a note or to scan note pages and digitize them, which snapshots and scans can later be referred to by a user.

However, these pictures or screenshots are static and are used simply for quick reference. A user may retype the content into a digital form or use an application that makes these written texts searchable using optical character recognition or a related technology. However, this is a time consuming process. Additionally, seeing notes taken in the original hand is more likely to remind the viewer of the original discussion that took place when the notes were first written. It would be helpful to automatically make images taken of these notes interactive, based on the structure of the content, without requiring transcription or searching of the content.

Therefore, there is a need for a method and apparatus for analyzing image content and automatically associating behaviors to the analyzed image content.

SUMMARY

A method and apparatus for analyzing image content and associating behaviors to the analyzed image content substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A-3H collectively illustrate the method of FIG. 2 as performed on an image including list items, according to one or more embodiments.

Figure 1:
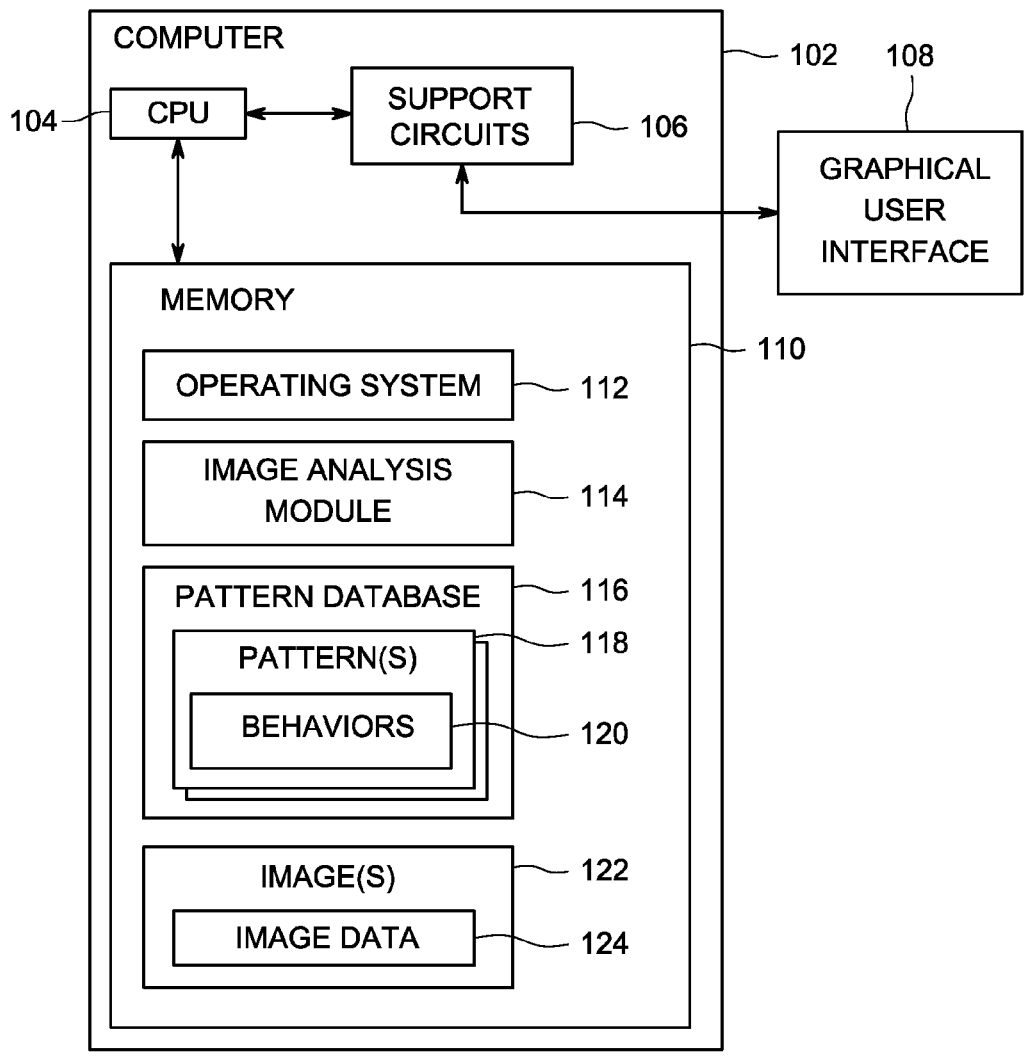
FIG. 1 is a block diagram of an apparatus for analyzing image content and associating behaviors to the analyzed image content, according to one or more embodiments.

While the method and apparatus is described herein by way of example for several embodiments and illustrative drawings, those skilled in the art will recognize that the method and apparatus for analyzing image content and associating behaviors to the analyzed image content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for analyzing image content and associating behaviors to the analyzed image content defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for analyzing image content and associating behaviors to the analyzed image content. The embodiments access an image. The image may be an imported image of a photograph that was taken of a memo board at a meeting, a scanned to-do list that was written on a piece of paper, and the like. The image is analyzed based on the structure of the contents in order to determine a pattern. For example, the analysis of the image may determine the image is of a list, a hierarchy of items, a flow diagram, scribbles, sketches, tables, and the like. The analyzed structure of the image is compared to a plurality of patterns in a pattern database in order to determine a match. Once the pattern of the image is determined, a pre-defined set of behaviors are associated with the pattern.

For example, if the image is determined to contain a list, a user may draw a check mark on a list item, cross out the list item, or use some other pre-defined indication that the list item has been completed. In response to receiving the indication, the list item may be digitally marked as complete, for example, by disabling the item, graying out the item, making the item smaller than the remaining items on the list, and the like. A list item may also be made "clickable", such that when clicked using a mouse, or a finger or stylus on a touch screen, a menu of actions is displayed including actions for selection, such as "assign due date", "associate links", "attach files", "link image", "add notes", and the like. A user may interact with the image using the pre-defined behaviors and when complete, the image and data associated with the user interactions are stored.

Advantageously, the present invention provides users of note taking techniques with a richer user experience. Users of the present invention may import images from many different sources, such as from ADOBE® Ideas, ADOBE® Collage, ADOBE® Review and Comment Connector, ADOBE® CREATIVE SUITE® and other products capable of producing images that may be imported and analyzed by the present invention. The embodiments turn a static image into an interactive document simply by analyzing the structure of the image.

In the context of this description, the term "pattern" means a regular or recurring design, such as, for example, the format of a list of To Do items, the term "behavior" means a response or reaction, such as a user selection, for example, of a particular item in a list of To Do items, and the term "interaction" means an action-reaction process that occurs between two objects, such as when a user selects a particular item in a list of To Do items, the To Do list reacts by deleting, for example, the selected item.

Various embodiments of a method and apparatus for analyzing image content and associating behaviors to the analyzed image content are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for analyzing image content and associating behaviors to the analyzed image content, according to one or more embodiments. The apparatus 100 includes a computer 102. The computer 102 is a computing device, such as a desktop computer, laptop, tablet computer, and the like that includes or is attached to a graphical user interface 108. The computer 102 includes a Central Processing Unit (CPU) 104, support circuits 106, and a memory 110. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like.

The memory 110 includes an operating system 112, an image analysis module 114, a pattern database 116, and one or more images 122. The pattern database 116 includes a plurality of patterns 118. Each pattern is associated with a set of rules and conditions that together define a pattern 118. For example, a "list" pattern may include the condition of "a set of horizontal patterned clusters aligned vertically on a left size". Each pattern 118 includes a set of behaviors 120 with which the pattern 118 is associated. The operating system 112 may include various commercially known operating systems.

When an image 122 is imported, the image analysis module 114 determines one or more recognizable patterns 118 in the image 122. In some embodiments, where the image 122 is derived from a note-taking scenario, the pattern database 116 includes the most common patterns 118 that are used in note-taking scenarios. The image analysis module 114 confirms with a user via the graphical user interface 108 whether the determined pattern 118 is correct. If the user response indicates that the determined pattern 118 is not correct, a menu of a next most probable pattern matches is displayed to the user for selection of a pattern 118.

Once a pattern 118 is determined, a set of associated behaviors 120 is accessed from the pattern database 116. The behaviors 120 provide a rich interactive user experience with the image 122. The behaviors 120 provide a user with a plurality of interactions with the image 122 that may be performed. For example, if the image 122 is determined to have a hierarchical structure, behaviors 120 may include collapsing levels of the hierarchy. Individual items within the hierarchical structure may be selected in order to associate links, attach files, add notes, and the like. When a user saves or closes the image 122, the user interactions are stored as image data 124.

Figure 2:
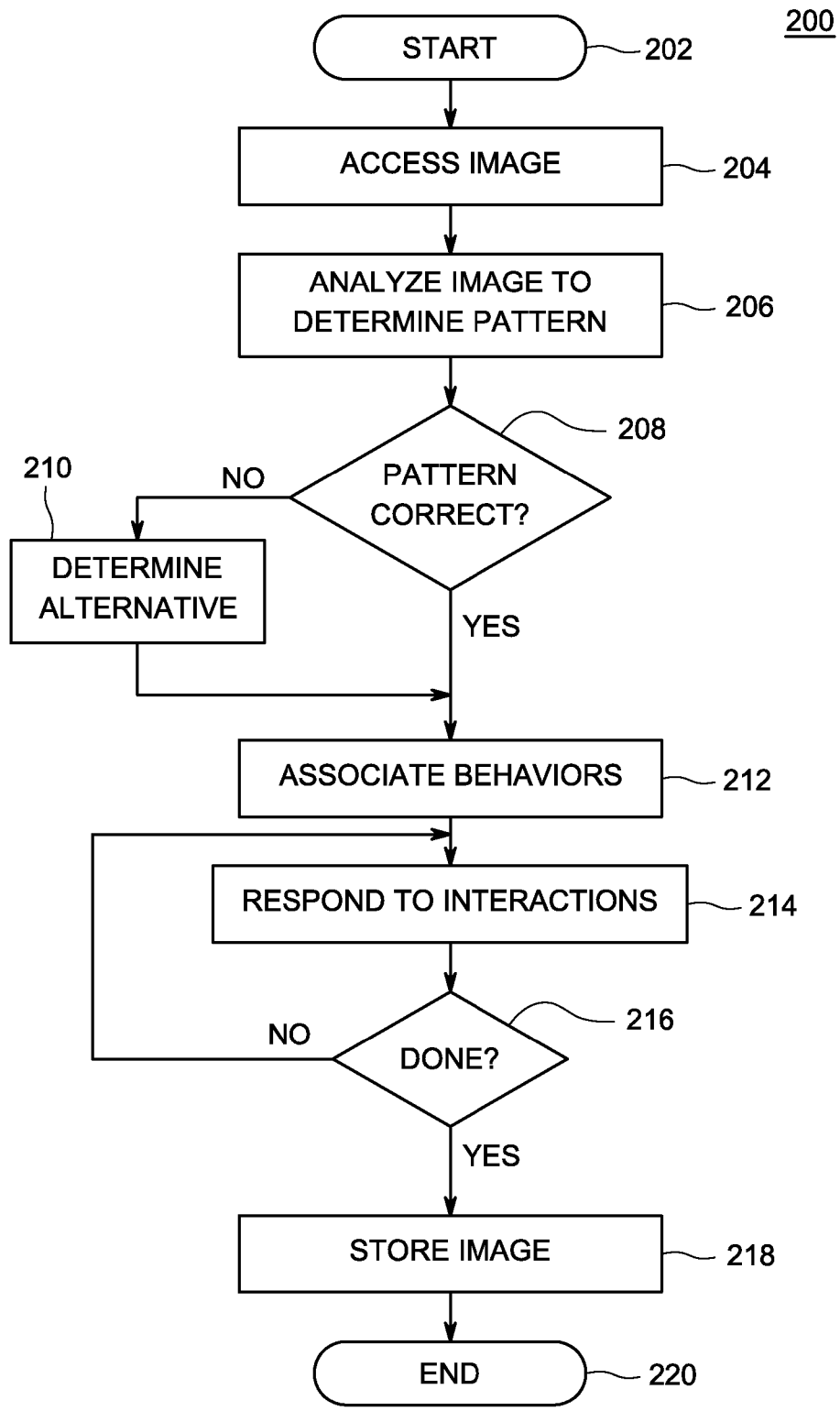
FIG. 2 is a flowchart of a method for analyzing image content and associating behaviors to the analyzed image content as performed by the image analysis module of FIG. 1, according to one or more embodiments.

FIG. 2 is a flowchart of a method 200 for analyzing image content and associating behaviors to the analyzed image content as performed by the image analysis module 114 of FIG. 1, according to one or more embodiments. The method 200 determines a pattern that matches the structure of the content of an image and associates behaviors with the image so as to provide a rich interactive user experience with the image.

The method 200 starts at step 202 and proceeds to step 204. At step 204, the method 200 accesses an image. The image may be a photograph of a whiteboard screen capture that includes notes from a meeting, a to-do list that was scanned, or any digitized image content. The method 200 proceeds to step 206, where the method 200 analyzes the image in order to determine one or more patterns in the image. Background foreground separation is performed, using any background foreground separation method known in the art. For example, the method 200 may perform the separation by binarizing the image into black and white. The method 200 then performs multiple scans on the binarized image to determine a maximum number of pixels of one type. Once the maximum number of pixels of one type are identified, the method 200 classifies these maximum number of pixels as the background and the remaining pixels are identified as the foreground.

In some embodiments, the method 200 uses optical character recognition (OCR) techniques to correctly orient the image. The method 200 may then rotate the image clockwise or counterclockwise to ensure that the foreground pixels in the image align. Optionally, the method 200 may remove noise from the image using de-speckling techniques known in the art to smooth out the image.

The method 200 breaks the image into areas and combines smaller areas into larger areas, as described in further detail with respect to FIG. 3 below. The method 200 uses layout analysis or "zoning" to identify columns, paragraphs, captions, and the like as distinct blocks. The method 200 identifies separate areas of dense pixels to create a first level of blocks, wherein each block represents a single element, for example, a list. Within the first level of blocks, the method 200 subdivides the one or more blocks into smaller chunks based on color, size and clusters of pixels. The method 200 determines specific patterns by identifying the alignment of the clusters of pixels. For example, the cluster of pixels may be aligned in a row or a column, or each row may have a similar offset.

The method 200 uses the structure of the areas of the image, that is, its physical layout, to match the structure to one or more patterns in a pattern database. The pattern database includes sets of rules and conditions that together identify specific patterns. For example, a list may include a condition that if a set of horizontal patterned clusters align vertically on a left side, this may be a list. In addition, rules for identifying patterns in the image that make up bullets, or identifying a heading, which would be a larger size, different colored, or underlined first row, would increase the probability that the pattern fits into the "list" category. Similar rules and conditions are predefined for a hierarchy, a flowchart, a table, a scribble, a sketch, a diagram, and the like. The method 200 matches the structure of the content of the image to one or more patterns in the pattern database.

The first level of blocks may include multiple types of a pattern, such as a plurality of lists, or a plurality of different patterns, such as a list, a flow diagram, and a table. When more than one pattern is found in an image, each area is processed separately. The method 200 determines a most probable pattern match for each area of the image.

The method 200 proceeds to step 208, where the method 200 determines whether the pattern match is correct. The method 200 displays a message over the content requesting confirmation of the pattern match. The message may be, for example, "Is this a list? YES NO". If the method 200 receives confirmation that the pattern is matched correctly, via, for example, a YES response, the method 200 proceeds to step 212. However, if the method 200 receives input that the pattern is not matched correctly, via, for example, a NO response, the method 200 proceeds to step 210.

At step 210, the method 200 presents the user with other possible patterns that may match the content, such as for example, a dropdown menu of probable patterns that may match the content. The method 200 receives the user input of a selection of one of the patterns and the method 200 proceeds to step 212.

At step 212, the method 200 associates behaviors with the identified pattern. The method 200 accesses the pattern database in order to retrieve a set of pre-defined behaviors that are associated with the pattern. A plurality of interactions are defined to be enabled for a particular type of pattern. For example, for a list, the items of the list may be selectable. Additional actions may be performed on the list as a whole or on individual items in the list, for example, assigning a due date, attaching files, adding notes, and the like. In addition, behaviors such as checking off a list item or crossing off a list item may be associated with defined the list item as "completed". It is appreciated that embodiments of the present disclosure envision additional possible actions that may be taken and additional possible behaviors may be associated with a given pattern.

The method 200 proceeds to step 214, wherein the method 200 responds to interactions from a user via a graphical user interface. For example, a user may cross out or check off an item, for instance a list item, with a mouse, finger, stylus, or other input device in a manner that is pre-defined to mean that the list item is complete. In response, the method 200 alters the display of the item in the graphical user interface to indicate that the item is complete, for example, by visually disabling the item by graying out the item, displaying the completed item smaller than the other items, color coding the completed item, and the like. The method 200 may respond to clicking on a list item with, for example a mouse, finger, stylus, and the like to highlight the list item. The method 200 may respond to double clicking on a list item by displaying a dropdown menu of actions that may be performed on the list item.

For example, the list may be a list of names or photographs of individuals. Double clicking on an item (i.e., the name or photo of an individual) presents a menu of actions to perform on the list item. For example, if the list is of names, an action to link an image may be selected to attach a photograph of the individual to the list item. An action of "assign date" may be selected to input the individual's birth date. An action to "add notes" may be selected to input information about the individual that a user may want to remember, for example, the persons' likes or dislikes, or the names of the individual's children.

The method 200 proceeds to step 216, where the method 200 determines whether a user is done interacting with an image. For example, the user may save and close the image. If the method 200 determines that the user is not done, the method 200 proceeds to step 214 and allows the interaction with the image to continue. However, if at step 216, the method 200 determines that a user is done interacting with an image, the method 200 proceeds to step 218, where the method 200 stores the image along with any data related to the interactions. The method 200 proceeds to step 220 and ends.

Figure 3D:
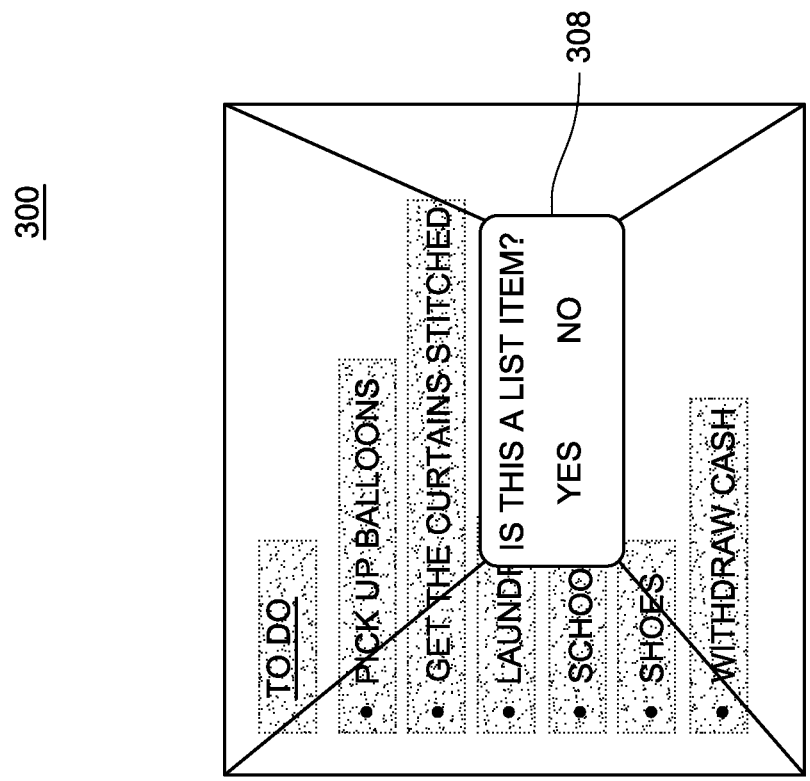

FIGS. 3A-3H collectively illustrate, the method 200 of FIG. 2 as performed on an image 300 including list items, according to one or more embodiments. FIG. 3A depicts an image 300 of a to-do list 302, according to one or more embodiments. The actual text that makes up the to-do list 302 is irrelevant to the embodiment. FIG. 3B depicts how the text contents of to-do list 302 are broken into a plurality of individual boxes 304, according to one or more embodiments.

Figure 3C:
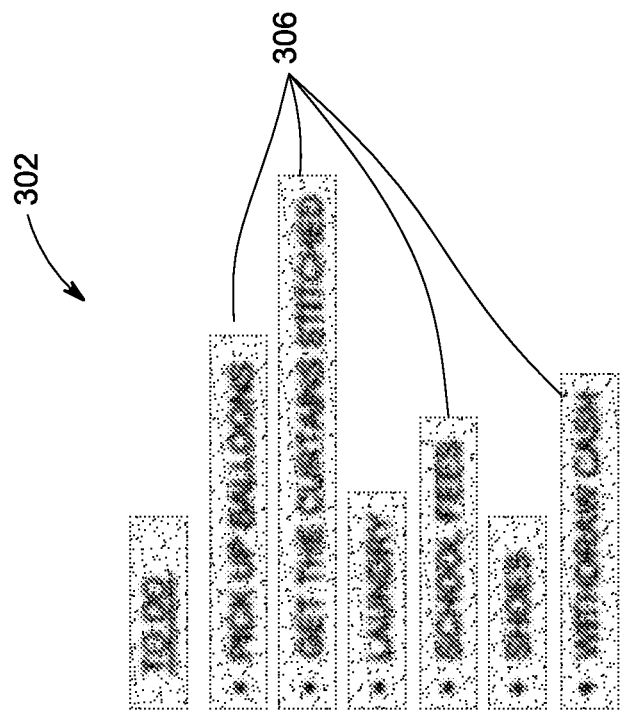

FIG. 3C depicts how the individual boxes of the to-do list 302 are combined into areas 306, according to one or more embodiments. By matching the configuration of the areas 306 to patterns found in a pattern database, it is determined that the image 300 is a list. FIG. 3D depicts displaying a confirmation 308 regarding the determined image, according to one or more embodiments. The confirmation 308 allows a user to confirm that the image 300 is indeed a list. A set of pre-defined behaviors is associated to the list items upon confirmation. The set of behaviors is stored in the pattern database as being associated with the list pattern. The set of behaviors defines interactions with the image 300 so as to provide a rich user experience.

Figure 3F:
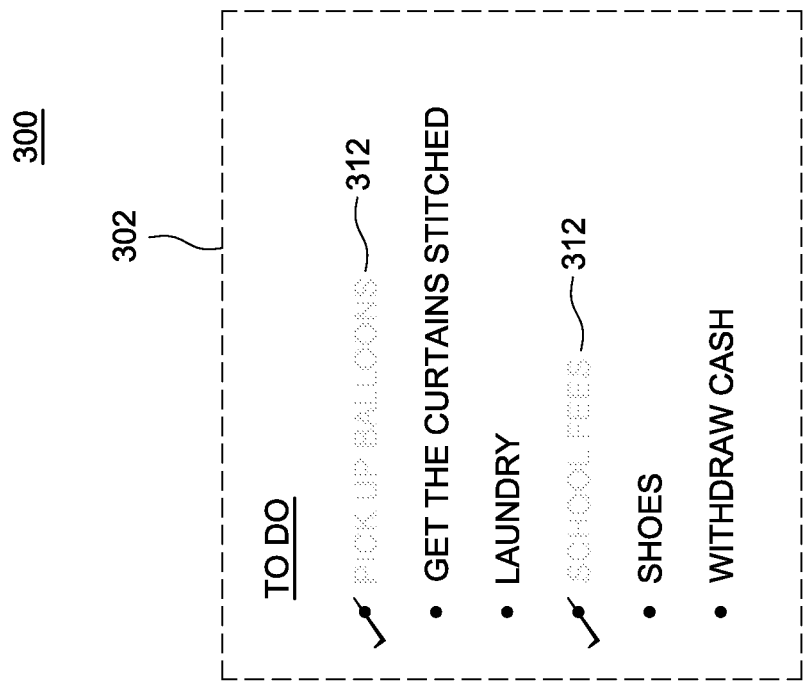
Figure 3E:
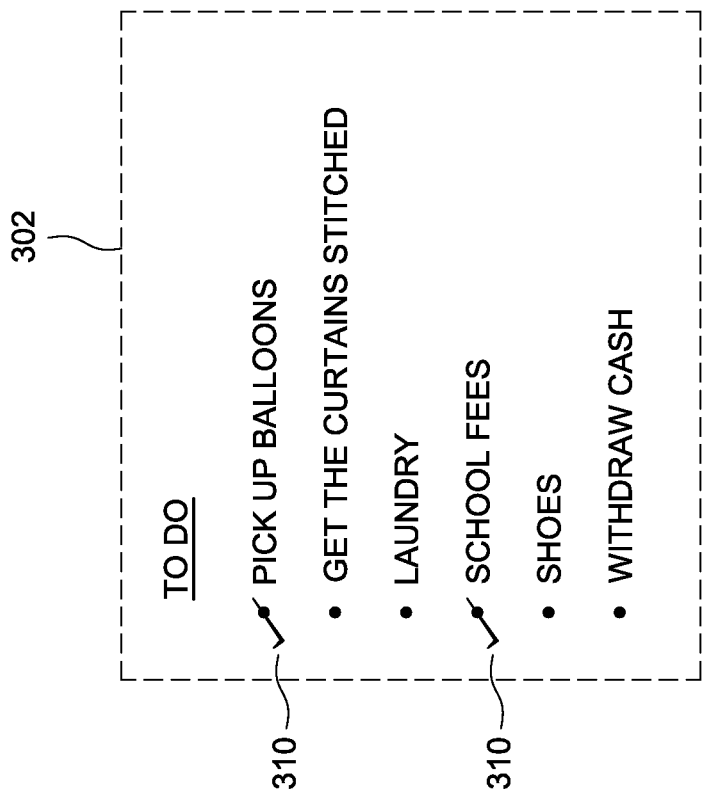

FIG. 3E depicts marking items in the to-do list 302 as completed, according to one or more embodiments. The check marks 310 are user interactions interpreted to mean the item on the list is complete. FIG. 3F depicts a visual illustration that the item on the to-do list 302 is complete, according to one or more embodiments. The items 312 are visually disable or grayed out. It is appreciated that in other embodiments other indications that an item is complete may be utilized, such as making the item smaller than the remaining items and the like.

FIG. 3G depicts selecting an item on the to-do list 302 according to one or more embodiments. The item 314 may be selected with a click by way of a finger 316 or other selection means, such as a stylus or a mouse. Once selected, any number of actions may be performed such as highlighting or color coding an item. FIG. 3H depicts selection of an item 314 of the to-do list 302, according to one or more embodiments. The item 314 may be selected using, for example, a double tap a finger 320 or other selection means, such as a stylus or a mouse. Upon receipt of a double tap, a dropdown menu 318 of actions that may be taken is displayed. Actions may include, but are not limited to, "add checklist", "assign due date", "associate links", "attach files", "link image", "add notes", and the like. It is appreciated that embodiments of the present disclosure envision addition possible actions that may be taken on an item 314. All interactions or modification to the image 300 are stored with the image.

Figure 4B:
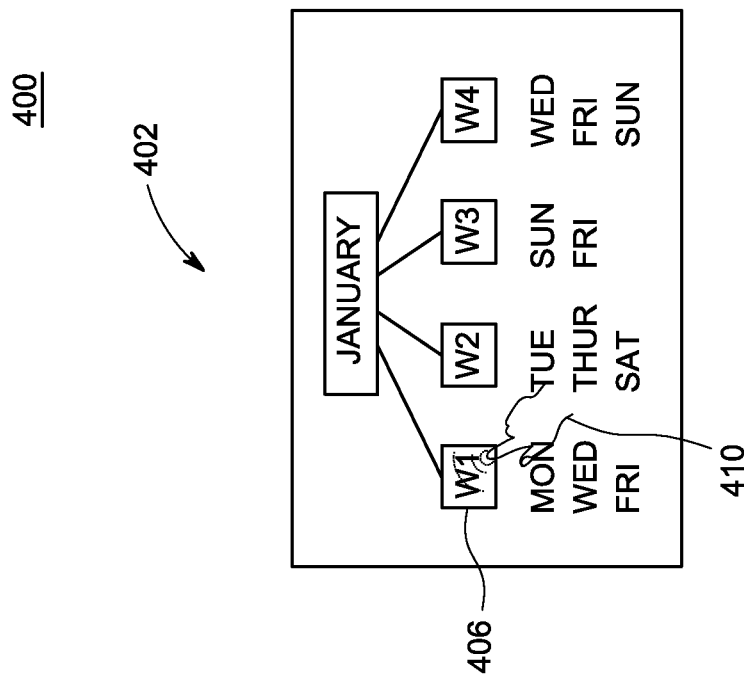
FIGS. 4A-4D illustrate the method of FIG. 2 as performed on an image including a hierarchy of items, according to one or more embodiments.
Figure 4A:
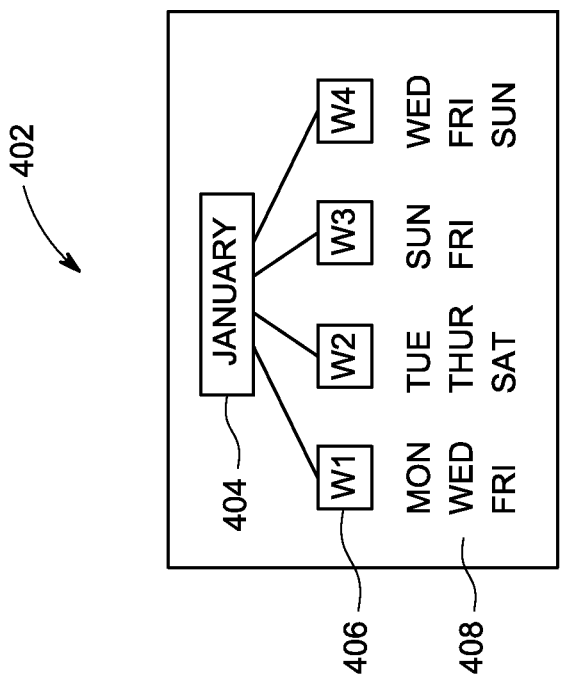

FIGS. 4A-4D illustrate the method of FIG. 2 as performed on an image 400 including a hierarchy of items, according to one or more embodiments. FIG. 4A depicts a hierarchy 402 of items. In this example, the hierarchy 402 comprises a calendar, and includes a root item 404 (e.g., a month of a plurality of months), above a plurality of items 406 (e.g., a week of a plurality of weeks). Each item 406 includes a list 408 (e.g., days of a plurality of days). FIG. 4B depicts selecting by double tap of a hierarchy item 406, according to one or more embodiments. Double tap selecting may be performed using a finger 410, a mouse, a stylus, or other input device. Double tap selecting is a behavior in the set of behaviors for a hierarchy, and may define collapsing or expanding a list or group of items.

Figure 4D:
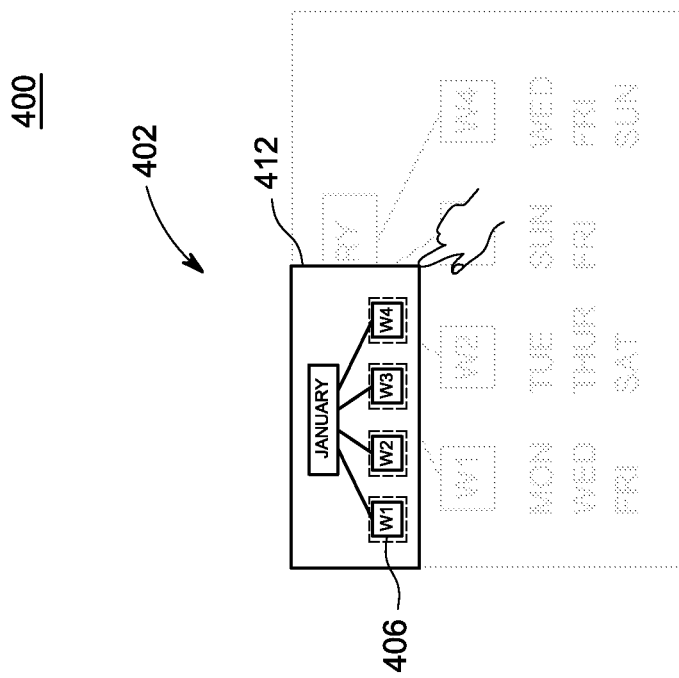
Figure 4C:
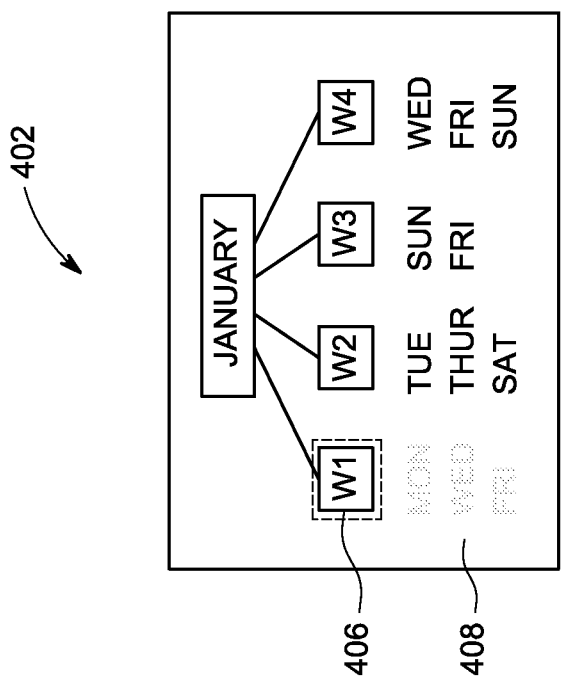

FIG. 4C depicts the image 400 after the hierarchy item 406 has been collapsed, according to one or more embodiments. The list 408 below the double tapped item 406 is indicated to be collapsed. FIG. 4D depicts the image 400 after all hierarchy items 406 are collapsed, according to one or more embodiments. FIG. 4D further depicts the hierarchy 402 as "scaled down", according to one or more embodiments. Scaling down is a pre-defined behavior of a hierarchy. Upon selecting and moving a corner of the hierarchy 402, the image 400 may be scaled down (i.e., re-sized) so as to depict the image 400 as a smaller sized image 412.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for analyzing digital images for patterns and modifying the digital images to provide the digital images with features that allow for user interaction with the identified patterns comprising:
   accessing a digital image;
   identifying, by at least one processor, a pattern within the digital image;

determining a type of pattern with which the identified pattern corresponds;

identifying, by the at least one processor, a set of pre-defined user actions associated with the type of pattern; and modifying, by the at least one processor, the digital image to provide one or more interactive features for the identified pattern, the one or more interactive features allowing a user to interact with the digital image and, based on the user interaction with the digital image, perform the set of pre-defined user actions relative to the identified pattern within the digital image, wherein the pre-defined user actions comprise at least one of expanding, collapsing, disabling, graying out, resizing, checking off, crossing off, assigning a due date, associating a link, attaching a file, linking an image, or adding notes to an item within the digital image.

2. The method of claim 1, wherein identifying a pattern within the digital image comprises:

breaking the digital image into blocks of content;

combining the blocks into areas of content;

comparing a structure of the areas of content to a plurality of patterns; and identifying the pattern from the plurality of patterns that matches the structure of the areas of content.

3. The method of claim 2, wherein breaking the digital image into blocks of content comprises:

performing separation of a background portion of the digital image from a foreground portion of the digital image comprising:

binarizing the digital image;

determining a maximum number of pixels of one type in the binarized image; and identifying the maximum number of pixels of one type as a background portion of the digital image and identifying the remaining pixels as a foreground portion of the digital image;

identifying one or more areas of dense pixels in the foreground portion of the digital image as a single element; and subdividing the single element into blocks based on color, size, and cluster of pixels.

4. The method of claim 1, wherein the set of pre-defined user actions comprise selecting the item within the digital image.

5. The method of claim 1, wherein the type of pattern is determined to comprise a hierarchical structure, and the set of pre-defined user actions comprises collapsing levels of the hierarchical structure.

6. The method of claim 1, wherein the type of pattern is one of a list, a hierarchy, a flowchart, a table, a scribble, a sketch, a matrix, a chart, or a pyramid.

7. The method of claim 1, wherein the type of pattern is determined to comprise a list, the list comprising a plurality of list items;

wherein the user interaction comprises at least one of crossing out at least one of the plurality of list items or drawing a check mark; and wherein performing the set of pre-defined user actions comprises at least one of disabling one or more of the plurality of list items, graying out one or more of the plurality of list items, or reducing the size of one or more of the plurality of list items.

8. An apparatus for analyzing static digital images for patterns and changing the static digital images into interactive documents that enable user interaction with the patterns comprising:

one or more processors;

a non-transitory storage medium comprising instructions, that when executed by the one or more processor, cause the apparatus to:

access a digital image;

identify a pattern within the digital image;

determine a type of pattern with which the identified pattern corresponds;

identify a set of pre-defined user actions associated with the type of pattern, and modify the digital image to provide one or more interactive features for the identified pattern, the one or more interactive features allowing a user to interact with the digital image and, based on the user interaction with the digital image, perform the set of pre-defined user actions relative to the identified pattern within the digital image, wherein the pre-defined user actions comprise at least one of expanding, collapsing, disabling, graying out, resizing, checking off, crossing off, assigning a due date, associating a link, attaching a file, linking an image, or adding notes to an item within the digital image.

9. The apparatus of claim 8, wherein the instructions, when executed by the one or more processor, cause the apparatus to identify the pattern within the digital image by:

breaking the digital image into blocks of content, wherein breaking the digital image into blocks comprises:

performing separation of a background portion of the digital image from a foreground portion of the digital image, wherein performing separation comprises:

binarizing the digital image;

determining a maximum number of pixels of one type in the binarized image;

identifying the maximum number of pixels of one type as a background portion of the digital image and identifying the remaining pixels as a foreground portion of the digital image;

identifying one or more areas of dense pixels in the foreground portion of the digital image as a single element;

subdividing the single element into blocks based on color, size, and cluster of pixels;

combining the blocks into areas of content;

comparing a structure of the areas of content to a plurality of patterns; and identifying a matched pattern from the plurality of patterns that matches the structure of the areas of content.

10. The apparatus of claim 8, wherein the set of pre-defined user actions comprises selecting the item within the digital image.

11. The apparatus of claim 8, wherein if the type of pattern is determined to comprise a hierarchical structure, the set of pre-defined user actions comprises collapsing levels of the hierarchical structure.

12. The apparatus of claim 8, further comprising instructions that, when executed by the at least one processor, cause the apparatus to:

compare the pattern within the digital image to a plurality of pattern types; and based on the comparison, determine a type of pattern from the plurality of pattern types with which the identified pattern corresponds;

wherein the plurality of pattern types are defined by a set of rules and conditions, and wherein the plurality of pattern types include a list, a hierarchy, a flowchart, a table, a scribble, a sketch, a matrix, a chart, and a pyramid.

13. The apparatus of claim 8, wherein the instructions, when executed by the one or more processor, cause the apparatus to determine the type of pattern by comparing the pattern within the digital image to a plurality of patterns in a pattern database and wherein no character recognition of text within the digital image is performed.

14. A method for identifying textual patterns in documents and associating user behaviors with the textual patterns to allow for an interactive user experience with the textual patterns, comprising:

analyzing, by at least one processor, a document for patterns of text;

identifying, by the at least one processor, a pattern of text of a predetermined type in the document, wherein the predetermined type of pattern of text comprises one of a list, a hierarchy, a flowchart, a table, a scribble, a sketch, a matrix, a chart, or a pyramid;

associating a pre-defined set of behaviors with the identified pattern of text in the document;

receiving an input indicating a user action with the identified pattern of text in the document; and based on the associated pre-defined set of behaviors with the identified pattern of text in the document and the received input indicating a user action with the identified pattern of text in the digital image, interactively modifying the identified pattern of text in the document, wherein modifying comprises at least one of expanding, collapsing, disabling, graying out, resizing, checking off, crossing off, assigning a due date, associating a link, attaching a file, linking an image, or adding notes.

15. The method as recited in claim 14, wherein the document comprises notes composed by a user.

16. The method as recited in claim 15, wherein the notes comprises handwritten notes.

17. The method as recited in claim 14, wherein:

the pattern of text of a predetermined type comprises a list;

the user action comprises checking an item from the list; and interactively modifying the identified pattern of text in the document comprises graying out the item from the list.

18. The method as recited in claim 14, wherein:

the pattern of text of a predetermined type comprises a hierarchy;

the user action comprises selecting an item in the hierarchy; and interactively modifying the identified pattern of text in the document comprises collapsing or expanding a list of items below the selected item in the hierarchy.

19. The method as recited in claim 14, further comprising:

providing a prompt seeking confirmation that the pattern of text comprises the predetermined type of pattern of text; and associating the pre-defined set of behaviors with the identified pattern of text in the document in response to user input confirming that the pattern of text comprises the predetermined type of pattern of text.

20. The method as recited in claim 14, further comprising:

converting the document into a digital image; and using optical character recognition techniques to recognize text with in the digital image.

* * * * *